US012315991B2

(12) United States Patent
Dutta et al.

(10) Patent No.: US 12,315,991 B2
(45) Date of Patent: May 27, 2025

(54) METASURFACE ENABLED IN-VEHICLE LINK ENHANCEMENT

(71) Applicant: QUALCOMM Incorporated, San Diego, CA (US)

(72) Inventors: Sourjya Dutta, San Diego, CA (US); Shailesh Patil, San Diego, CA (US); Qing Li, Princeton Junction, NJ (US); Kapil Gulati, Belle Mead, NJ (US); Gene Wesley Marsh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 18/066,015

(22) Filed: Dec. 14, 2022

(65) Prior Publication Data

US 2024/0204393 A1 Jun. 20, 2024

(51) Int. Cl.
*H01Q 1/32* (2006.01)
*H01Q 15/00* (2006.01)

(52) U.S. Cl.
CPC ............. *H01Q 1/3275* (2013.01); *H01Q 1/32* (2013.01); *H01Q 15/00* (2013.01); *H01Q 15/0086* (2013.01)

(58) Field of Classification Search
CPC .... H01Q 1/3275; H01Q 15/0086; H01Q 1/32; H01Q 15/00
See application file for complete search history.

(56) References Cited

U.S. PATENT DOCUMENTS

| | | | | |
|---|---|---|---|---|
| 2010/0036666 | A1* | 2/2010 | Ampunan | G10L 13/00 707/E17.014 |
| 2019/0067826 | A1* | 2/2019 | Achour | H01Q 21/065 |
| 2020/0196391 | A1* | 6/2020 | Park | H05B 6/46 |
| 2021/0011437 | A1* | 1/2021 | Migneco | H04W 4/40 |
| 2022/0085514 | A1* | 3/2022 | Enescu | H01Q 15/0086 |
| 2022/0123803 | A1* | 4/2022 | Rimalapudi | H04B 7/0626 |

FOREIGN PATENT DOCUMENTS

| | | | |
|---|---|---|---|
| EP | 4228097 | A1 | 8/2023 |
| WO | 2022095978 | A1 | 5/2022 |

OTHER PUBLICATIONS

International Search Report and Written Opinion—PCT/US2023/077545—ISA/EPO—Feb. 6, 2024.

* cited by examiner

*Primary Examiner* — Hai V Tran
(74) *Attorney, Agent, or Firm* — Harrity & Harrity LLP / Qualcomm

(57) ABSTRACT

Various aspects of the present disclosure generally relate to wireless communication. In some aspects, an apparatus of a vehicle may include one or more meta-surfaces disposed on one or more glass surfaces of the vehicle. The one or more meta-surfaces may be configured to redirect electromagnetic waves incident on the one or more meta-surfaces toward one or more target points within the vehicle.

30 Claims, 11 Drawing Sheets

METASURFACE ENABLED IN-VEHICLE LINK ENHANCEMENT

FIELD OF THE DISCLOSURE

Aspects of the present disclosure generally relate to wireless communication and to techniques and apparatuses for meta-surface enabled in-vehicle link enhancement.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus of a vehicle. The apparatus of the vehicle may include one or more meta-surfaces disposed on one or more glass surfaces of the vehicle, the one or more meta-surfaces configured to redirect electromagnetic waves incident on the one or more meta-surfaces toward one or more target points within the vehicle.

Some aspects described herein relate to an apparatus of a vehicle. The apparatus of the vehicle may include an in-vehicle telematics unit, an in-vehicle telematics antenna connected to the in-vehicle telematics unit, and one or more meta-surfaces disposed on one or more glass surfaces of the vehicle. The one or more meta-surfaces may include at least one meta-surface configured to redirect electromagnetic waves incident on the at least one meta-surface toward the in-vehicle telematics antenna.

Some aspects described herein relate to a method of wireless communication performed by an apparatus of a user equipment (UE). The method may include determining, for a meta-surface on a glass surface of a vehicle, a transfer function that redirects electromagnetic waves incident on the meta-surface with an incident angle equal to a target incident angle or within a range of target incident angles toward a target point within the vehicle. The method may include controlling the meta-surface, via an electrical control signal, to configure the meta-surface to redirect the electromagnetic waves incident on the meta-surface in accordance with the transfer function.

Some aspects described herein relate to a UE for wireless communication. The UE may include a memory and one or more processors coupled to the memory. The one or more processors may be configured to determine, for a meta-surface on a glass surface of a vehicle, a transfer function that redirects electromagnetic waves incident on the meta-surface with an incident angle equal to a target incident angle or within a range of target incident angles toward a target point within the vehicle. The one or more processors may be configured to control the meta-surface, via an electrical control signal, to configure the meta-surface to redirect the electromagnetic waves incident on the meta-surface in accordance with the transfer function.

Some aspects described herein relate to a non-transitory computer-readable medium that stores a set of instructions for wireless communication by a UE. The set of instructions, when executed by one or more processors of the UE, may cause the UE to determine, for a meta-surface on a glass surface of a vehicle, a transfer function that redirects electromagnetic waves incident on the meta-surface with an incident angle equal to a target incident angle or within a range of target incident angles toward a target point within the vehicle. The set of instructions, when executed by one or more processors of the UE, may cause the UE to control the meta-surface, via an electrical control signal, to configure the meta-surface to redirect the electromagnetic waves incident on the meta-surface in accordance with the transfer function.

Some aspects described herein relate to an apparatus for wireless communication. The apparatus may include means for determining, for a meta-surface on a glass surface of a vehicle, a transfer function that redirects electromagnetic waves incident on the meta-surface with an incident angle equal to a target incident angle or within a range of target incident angles toward a target point within the vehicle. The apparatus may include means for controlling the meta-surface, via an electrical control signal, to configure the meta-surface to redirect the electromagnetic waves incident on the meta-surface in accordance with the transfer function.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
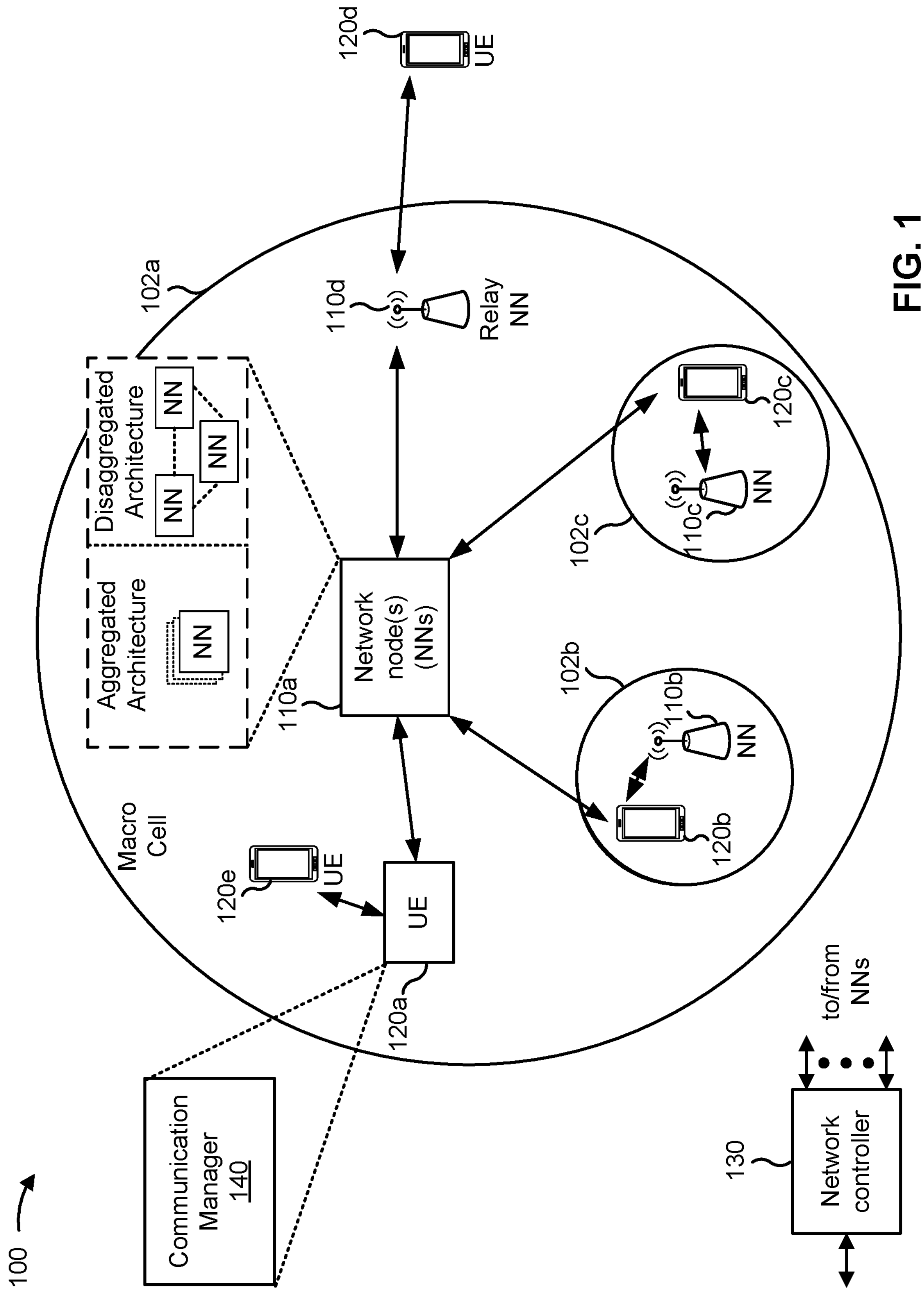
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor (e.g., an in-vehicle telematics unit/device), a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IOT) devices, and/or may be implemented as NB-IOT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may determine, for a meta-surface on a glass surface of a vehicle, a transfer function that redirects electromagnetic waves incident on the meta-surface with an incident angle equal to a target incident angle or within a range of target incident angles toward a target point within the vehicle; and control the meta-surface, via an electrical control signal, to configure the meta-surface to redirect the electromagnetic waves incident on the meta-surface in accordance with the transfer function. Additionally, or alternatively, the communication manager 140 may perform one or more other operations described herein.

As indicated above, FIG. 1 is provided as an example. Other examples may differ from what is described with regard to FIG. 1.

Figure 2:
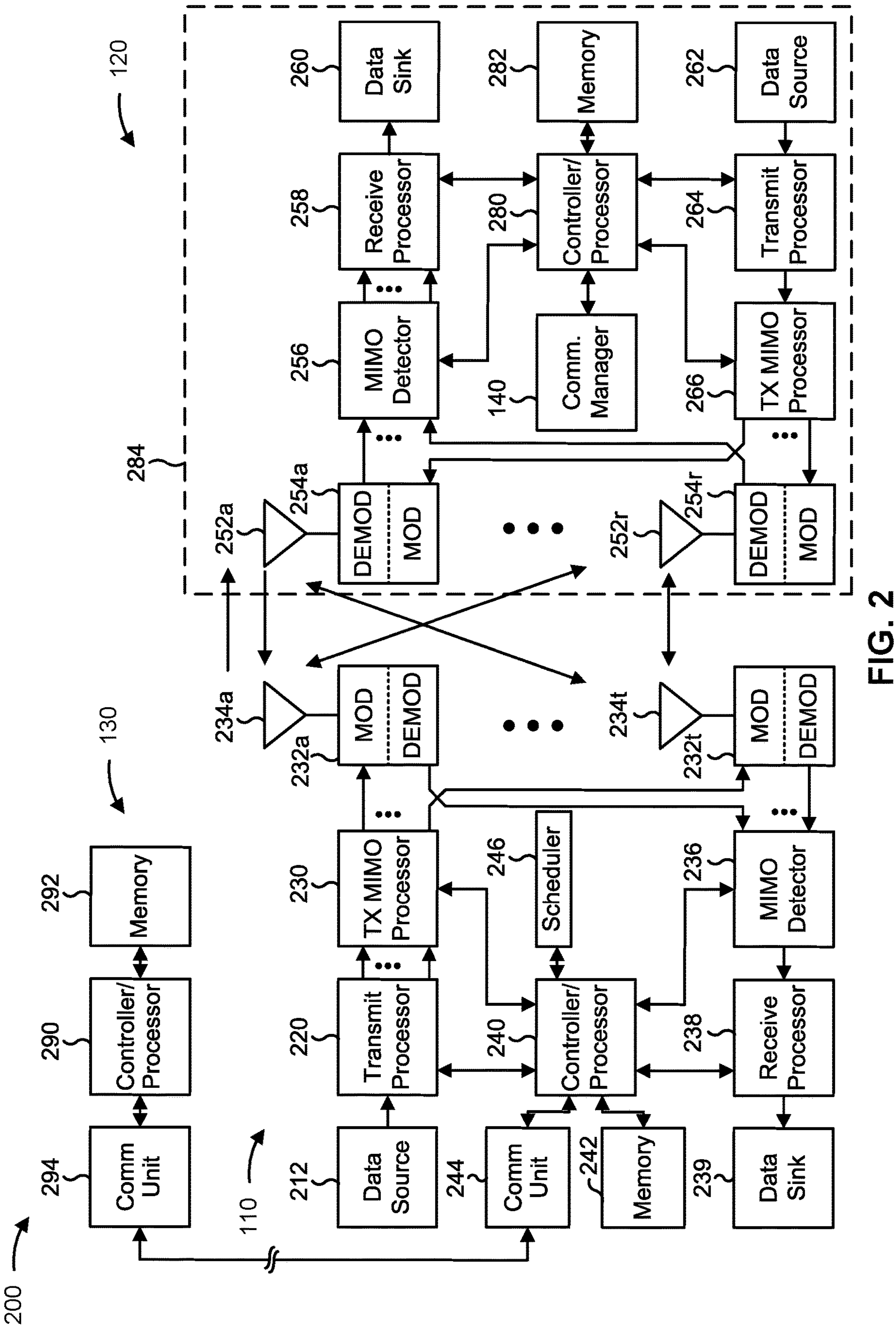
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6A-6D and 7-8).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6A-6D and 7-8).

The controller/processor 240 of the network node 110, the controller/processor 280 of the UE 120, and/or any other component(s) of FIG. 2 may perform one or more techniques associated with meta-surface enabled in-vehicle link enhancement, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, and/or other processes as described herein. In some examples, executing instructions may include running the instructions, converting the instructions, compiling the instructions, and/or interpreting the instructions, among other examples.

In some aspects, a UE (e.g., the UE 120) includes means for determining, for a meta-surface on a glass surface of a vehicle, a transfer function that redirects electromagnetic waves incident on the meta-surface with an incident angle equal to a target incident angle or within a range of target incident angles toward a target point within the vehicle; and/or means for controlling the meta-surface, via an electrical control signal, to configure the meta-surface to redirect the electromagnetic waves incident on the meta-surface in accordance with the transfer function. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
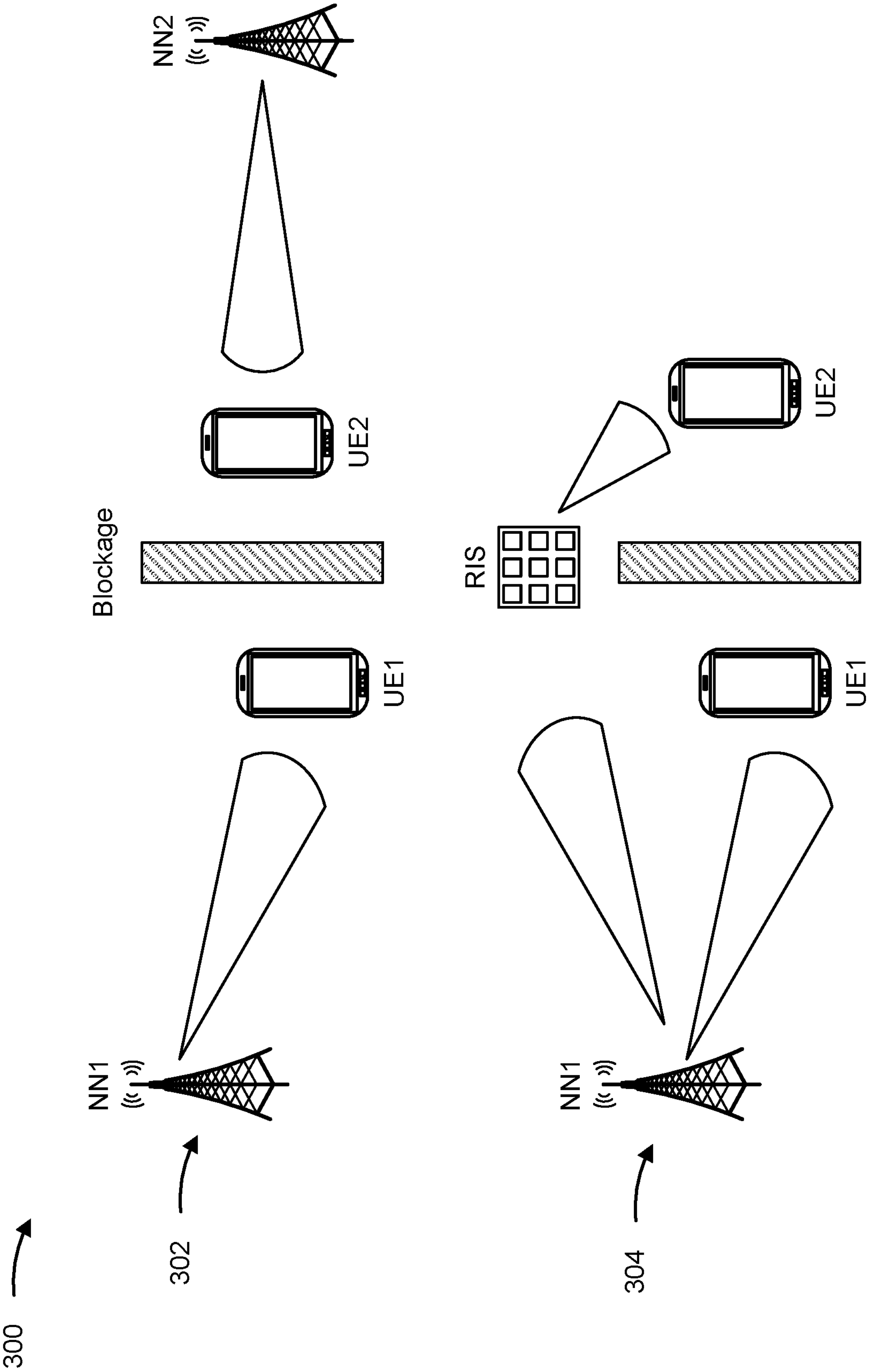
FIG. 3 is a diagram illustrating an example of a reconfigurable intelligent surface (RIS).

FIG. 3 is a diagram illustrating an example 300 of a reconfigurable intelligent surface (RIS). As shown by reference number 302, a first network node (NN1) may transmit a first downlink transmission to a first UE (UE1). A second network node (NN2) may transmit a second downlink transmission to a second UE (UE2). The first UE and the second UE may be separated by a blocking medium (e.g., a medium that blocks or attenuates electromagnetic waves). As a result, downlink transmissions from the first network node may not be received by the second UE, and downlink transmissions from the second network node may not be received by the first UE. As shown by reference number 304, an RIS may be employed in proximity to the blocking medium. The first network node may transmit a first downlink transmission to the first UE and a second downlink transmission to the RIS. The RIS may include a plurality of elements that reflect the second downlink transmission in a direction toward the second UE. As a result, the first network node may effectively perform downlink transmissions to the second UE via the RIS, even though the blockage is present between the first network node and the second UE.

The RIS may be or may include a meta-surface. A meta-surface is a fabricated surface that can transmit (e.g., refract) and/or reflect an incident electromagnetic wavefront anomalously. Anomalous reflection or refraction refers to reflection or refraction that does not obey general laws of optics (e.g., Snell's law) that apply to naturally occurring materials. A meta-surface may be a planar or two-dimensional structure or surface composed of multiple smaller meta-material structures (referred to as meta-elements) that may be configured to control a direction or angle at which signals or electromagnetic waves impinging on the meta-surface are reflected or refracted/transmitted from the meta-surface.

The RIS may be or may include a meta-surface that is designed to have properties to enable dynamic control of signals or electromagnetic waves reflected and/or refracted/transmitted by the RIS. The RIS may include one or more reconfigurable elements. For example, the RIS may include an array of reconfigurable elements (e.g., an array of uniformly distributed reconfigurable elements). The reconfigurable elements may be meta-elements with a reconfigurable electromagnetic characteristic. For example, the electromagnetic characteristic may include a reflection characteristic (e.g., a reflection coefficient), a scattering characteristic, an absorption characteristic, and/or a diffraction characteristic. The electromagnetic characteristic(s) of each reconfigurable element may be independently controlled and changed over time. The electromagnetic characteristic(s) of each reconfigurable element may be independently configured such that the combination of configured states of the reconfigurable elements reflects or refracts/transmits an incident signal or waveform in a controlled manner. For example, the reconfigurable elements may be configured to reflect or refract/transmit an impinging signal in a controlled manner, such as by reflecting or refracting the impinging signal in a desired direction, with a desired beam width, with a desired phase, with a desired amplitude, and/or with a desired polarization, among other examples. In other words, the RIS may be capable of modifying one or more properties (e.g., direction, beam width, phase, amplitude, and/or polarization) of an impinging signal.

The reconfigurable elements of the RIS may be controlled and/or configured by an RIS controller. The RIS controller may be a control module (e.g., a controller and/or a processor) that is capable of configuring the electromagnetic characteristic(s) of each reconfigurable element of the RIS. The RIS controller may receive control communications from a network node (e.g., the first network node) indicating one or more properties of reflected signals to allow the network to control intelligent steering of electromagnetic waves by the RIS employed in the wireless network.

As indicated above, FIG. 3 is provided as an example. Other examples may differ from what is described with respect to FIG. 3.

Figure 4:
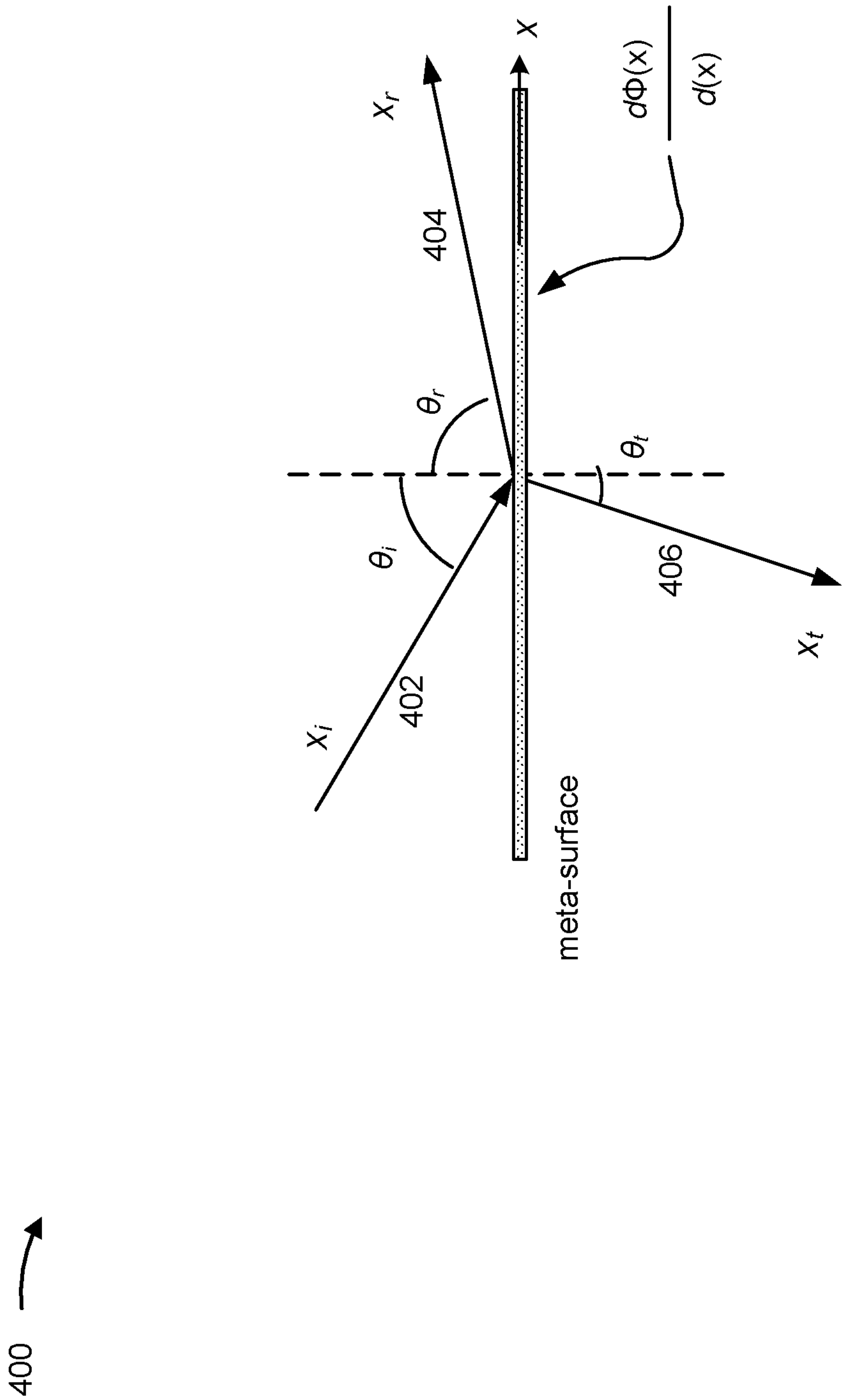
FIG. 4 is a diagram illustrating an example of signals directed to a meta-surface and signals directed from the meta-surface.

FIG. 4 is a diagram illustrating an example 400 of signals directed to a meta-surface and signals directed from the meta-surface. For example, the meta-surface may be an RIS.

As shown by reference number 402, a first signal $x_i$ may be a signal (e.g., a first electromagnetic wave) directed to the meta-surface. The first signal $x_i$ may be incident on the meta-surface with an incident angle ($\theta_i$). The meta-surface may redirect the first signal $x_i$ by reflecting the first signal $x_i$ and/or transmitting (e.g., refracting) the first signal $x_i$. As shown by reference number 404, the meta-surface may reflect the first signal $x_i$, resulting in a second signal $x_i$ (e.g., a reflected signal) that is reflected at a reflection angle $\theta_r$. As shown by reference number 406, the meta-surface may transmit/refract the first signal $x_i$, resulting in a third signal $x_i$ (e.g., a transmitted signal) that is transmitted/refracted at a transmission angle $\theta_t$ (also referred to a refraction angle). In some examples, reflection angle $\theta_r$ and/or the transmission angle $\theta_t$ at which an incident electromagnetic wave (e.g., the first signal $x_i$) is redirected by the meta-surface may be controlled based at least in part on a gradient of phase-discontinuity $$\frac{d\Phi(x)}{dx}$$

along a lengthwise direction x of the meta-surface. For example, based at least in part on the gradient of phase-discontinuity $$\frac{d\Phi(x)}{dx}$$

along the meta-surface, the meta-surface may control the angle at which incident electromagnetics wave are redirected (e.g., reflected or transmitted/refracted) by imparting local gradient phase shifts to the incident electromagnetic waves. For a two-dimensional meta-surface, the phase change can be defined along the surface in both x and y directions.

A wireless channel between a transmitter (Tx) device and a receiver (Rx) device may be determined by the reflections, refractions, and/or diffractions of an electromagnetic wave passing through a medium between the Tx device and the Rx device. In some examples (e.g., as shown in FIG. 3), placing a meta-surface (e.g., an RIS) in this medium can enable intelligent steering of electromagnetic waves toward or away from an Rx device. In this way, a network may provide intelligent control of the wireless medium. In some examples, a meta-surface may be transparent and transmissive. For example, a transparent meta-surface may be a meta-surface with an optical transparency that satisfies a transparency threshold (e.g., 80%). A transmissive meta-surface may be a meta-surface that controls an angle at which incident/impinging electromagnetic waves that pass through the meta-surface are refracted. In this way, the transmissive meta-surface transmits incident/impinging electromagnetic waves at a desired transmission angle $\theta_t$.

As indicated above, FIG. 4 is provided as an example. Other examples may differ from what is described with regard to FIG. 4.

Figure 5:
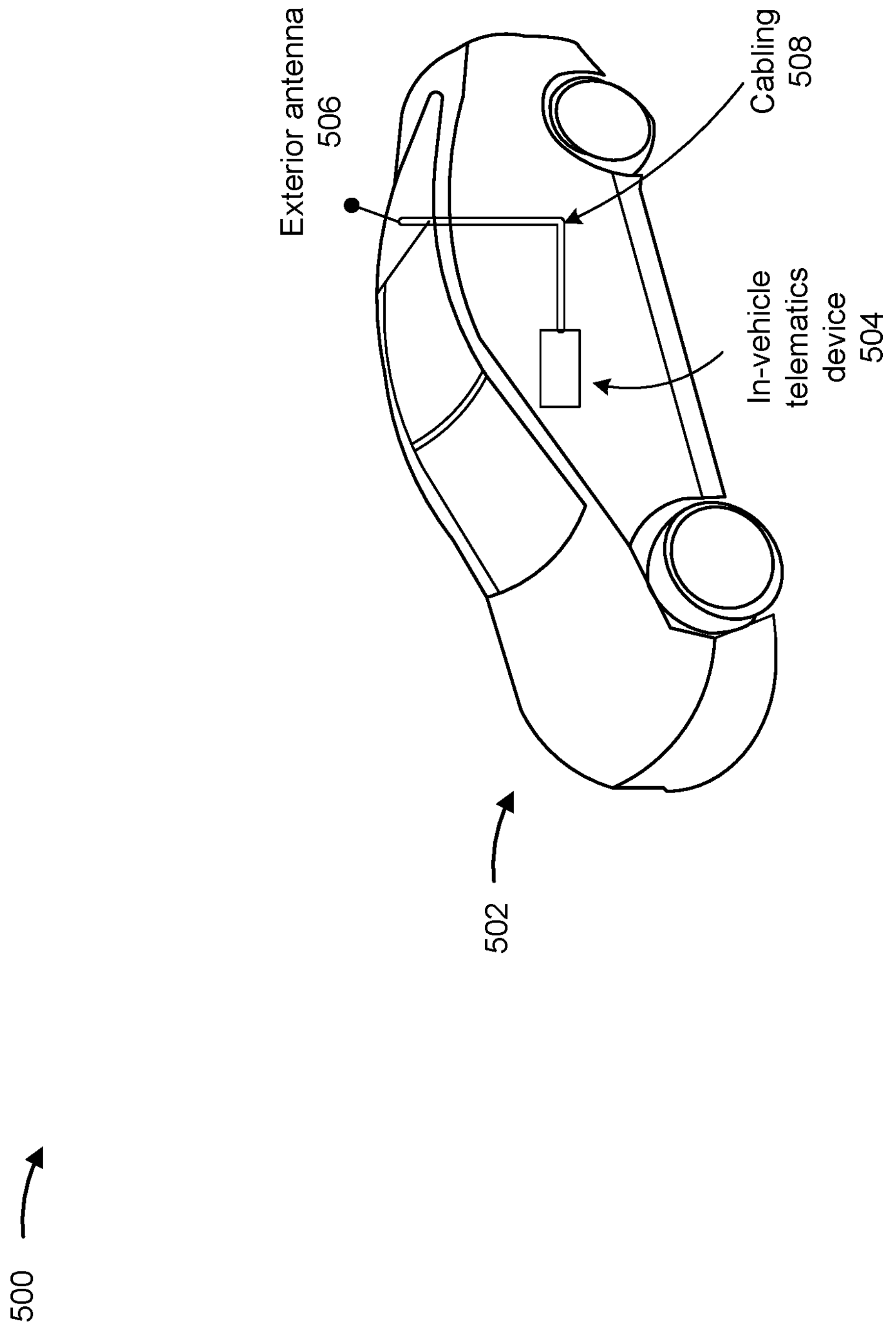
FIG. 5 is a diagram illustrating an example of a vehicular telematics unit connected to an external antenna, in accordance with the present disclosure.

FIG. 5 is a diagram illustrating an example 500 of vehicular telematics unit connected to an external antenna, in accordance with the present disclosure.

In-vehicle penetration loss (or outside-inside penetration loss) refers to attenuation or pathloss of mobile signals (e.g., transmitted via electromagnetic waves) inside of a vehicle, as compared to the mobile signals outside of the vehicle. Such in-vehicle penetration loss may be significant at many frequency bands. In this case, mobile signals received by an antenna (e.g., an antenna of a UE and/or a telematics unit) inside a vehicle may experience high penetration losses as compared to mobile signals received by an antenna outside of the vehicle. For example, mobile signals received by an antenna on a console of a vehicle may have a pathloss of 10-15 dB higher than mobile signals received by an antenna on the roof of the vehicle. As a result, link quality and link reliability may be reduced for UEs inside a vehicle (e.g., passenger/driver hand-held UEs, among other examples).

In some examples, due to in-vehicle penetration loss, an external antenna may be used for a vehicular telematics unit. As shown in FIG. 5, a vehicle 502 may include an in-vehicle telematics unit 504 (e.g., a vehicular telematics device). The in-vehicle telematics unit 504 may track/monitor various information relating to the vehicle 502, such as location-based information (e.g., geographic location, acceleration, and/or speed, among other examples), vehicle specific information (e.g., fuel level, fuel consumption, and/or vehicle status, among other examples), and/or other information relating to the vehicle 502, and may communicate the information via a wireless network (e.g., via communications with a network node). As further shown in FIG. 5, the vehicle 502 may be equipped with an external antenna 506 (e.g., a vehicular telematics antenna external to the vehicle 502) for the in-vehicle telematics unit 504. The in-vehicle telematics unit 504 may be connected to the external antenna 506 via cabling 508 (e.g., via one or more cables or wires). The cabling 508 between the external antenna 506 and the in-vehicle telematics unit 504 may be expensive and result in increased power consumption, as compared to directly connecting the in-vehicle telematics unit 504 with an antenna inside of the vehicle. Furthermore, the cabling may cause loss in signal strength of signals transmitted between the external antenna 506 and the in-vehicle telematics unit 504 on the cabling 508. Placing the telematics antenna inside the vehicle may reduce cost and power consumption due to reduced cabling. However, the in-vehicle penetration loss may cause decreased link quality and link reliability for an in-vehicle telematics unit with an in-vehicle antenna.

Some techniques and apparatuses described herein enable in-vehicle link enhancement. In some aspects, an apparatus of a vehicle may include one or more meta-surfaces disposed on one or more glass surfaces of the vehicle. The one or more meta-surfaces may be configured to redirect electromagnetic waves incident on the one- or more meta-surfaces toward one or more target points within the vehicle. As a result, link quality and reliability may be boosted at the one or more target points within the vehicle. In this way, in-vehicle penetration loss may be reduced, and link quality and reliability increased for a UE (e.g., a hand-held UE or a telematics unit, among other examples) at the one or more target points within the vehicle.

In some aspects, an apparatus of a vehicle may include an in-vehicle telematics unit, an in-vehicle telematics antenna connected to the in-vehicle telematics unit, and one or more meta-surfaces disposed on one or more glass surfaces of the vehicle. The one or more meta-surfaces may include at least one meta-surface configured to redirect electromagnetic waves incident on the at least one meta-surface toward the in-vehicle telematics antenna. As a result, in-vehicle penetration loss may be reduced for the in-vehicle telematics antenna, resulting in increased link quality and reliability for communications with the in-vehicle telematics unit connected to the in-vehicle telematics antenna. By reducing the in-vehicle penetration loss for the in-vehicle telematics antenna, the in-vehicle telematics antenna may be used in place of an external telematics antenna, which reduces or eliminates cabling between the in-vehicle telematics unit and the antenna. In this way, cost and power consumption of the in-vehicle telematics unit is reduced. Furthermore, the reduced cabling associated with the in-vehicle telematics antenna may reduce signal strength loss due to the cabling, and result in improved link quality and reliability, as compared with the external telematics antenna.

As indicated above, FIG. 5 is provided as an example. Other examples may differ from what is described with respect to FIG. 5.

FIGS. 6A-6D are diagrams illustrating an example 600 associated with meta-surface enabled in-vehicle link enhancement, in accordance with the present disclosure.

Figure 6A:
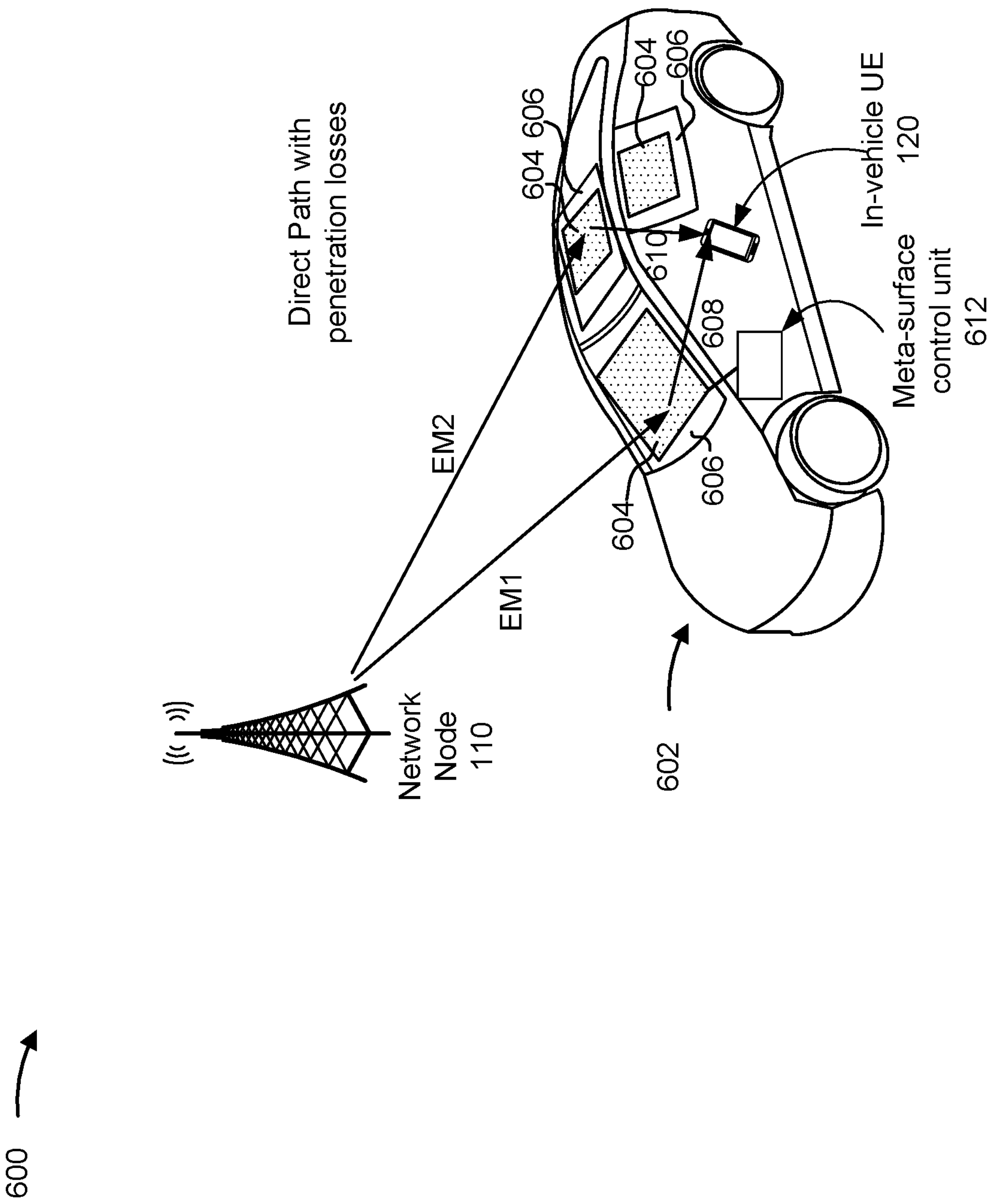
FIGS. 6A-6D are diagrams illustrating an example associated with meta-surface enabled in-vehicle link enhancement, in accordance with the present disclosure.

As shown in FIG. 6A, example 600 may include a vehicle 602 and communication between a network node 110 and a UE 120 located within the vehicle 602.

In some aspects, the vehicle 602 may be equipped or fitted with one or more meta-surfaces 604. The one or more meta-surfaces 604 may be transparent meta-surfaces. For example, the one or more meta-surfaces 604 may each have a respective transparency level that satisfies (e.g., is greater than or equal to) a transparency threshold (e.g., 80% transparency). Different meta-surfaces of the one or more meta-surfaces 604 may have different transparency levels or the same transparency level. In some aspects, each meta-surface may satisfy a transparency threshold associated with the glass surface on which the meta-surface is disposed. The transparency threshold associated with a glass surface of the vehicle may be a transparency threshold that corresponds to a minimum level of transparency for the glass surface. For example, the minimum level of transparency for a glass surface may be a minimum level of transparency required by a law or regulation or a minimum level of transparency set by a manufacturer of the vehicle, among other examples. In some examples, different glass surfaces of the vehicle (e.g., windshields, window, and/or sun roofs, among other examples) may have different transparency thresholds corresponding to different minimum levels of transparency for the different glass surfaces. In some aspects, at least one meta-surface 604 of the one or more meta-surfaces 604 may be an actively controlled meta-surface that is controllable to dynamically change a configuration of the meta-surface 604. For example, at least one meta-surface 604 of the one or more meta-surfaces 604 may be an RIS. In some aspects, all of the meta-surfaces 604 may be RISs (e.g., actively controlled meta-surfaces) or a portion of the meta-surfaces 604 may be RISs (e.g., actively controlled meta-surfaces). In some aspects, at least one meta-surface 604 of the one or more meta-surfaces 604 may be a passive meta-surface. A passive meta-surface is a meta-surface with a fixed configuration (e.g., determined during fabrication of the meta-surface) that cannot be dynamically changed.

In some aspects, the one or more meta-surfaces 604 may be disposed on one or more glass surfaces 606 of the vehicle 602. For example, the one or more glass surfaces 606 may include one or more windshields (e.g., a front windshield and/or a rear windshield), one or more windows, and/or one or more sun roofs (or moon roofs) of the vehicle 602, among other examples. In some aspects, a meta-surface 604 "disposed on" a glass surface 606 of the vehicle 602 may refer to the meta-surface 604 being attached to, deposited on, fabricated on, adhered to, pasted on, and/or applied to the glass surface 606, among other examples. In some aspects, at least one meta-surface 604 may be a thin-film coating deposited on a glass surface 606 of the vehicle 602 (e.g., over all or a portion of the glass surface 606). In some aspects, at least one meta-surface 604 may be directly fabricated on the vehicle glass for a glass surface 606 of the vehicle 602 during manufacturing of the glass surface 606.

In some aspects, multiple meta-surfaces 604 may be disposed on a same glass surface 606 of the vehicle 602. For example, the glass surface 606 may be partitioned into multiple meta-surfaces 604 with respective configurations depending at least in part on the geometry of the vehicle 602 and one or more target points within the vehicle 602. In some aspects, one or multiple glass surfaces 606 of the vehicle 602 may be partitioned into multiple meta-surfaces 604.

In some aspects, the one or more meta-surfaces 604 disposed on the one or more glass surfaces 606 of the vehicle

602 may be configured to redirect electromagnetic waves incident on the one or more meta-surfaces 604 toward one or more target points within the vehicle 602. For example, each meta-surface 604 may be a transparent and transmissive meta-surface that redirects impinging electromagnetic waves toward the target points by transmitting the electromagnetic waves through the meta-surface and into the vehicle 602 at a transmission angle (e.g., refraction angle) in accordance with the configuration of the meta-surface. In some aspects, the one or more target points within the vehicle 602 may be one or more target points associated with one or more UEs (e.g., the UE 120) inside the vehicle 602. For example, the one or more target points may include locations associated with one or more UEs within the vehicle 602 (e.g., a fixed location of a UE the vehicle 602, or a known location of a UE inside the vehicle 602). In some aspects, the one or more target points may include one or more expected in-vehicle UE locations, such as locations of one or more seats within the vehicle 602, locations associated with one or more UE charging ports within the vehicle 602, and/or other expected UE locations within the vehicle 602.

In some aspects, multiple meta-surfaces 604 may be configured to redirect electromagnetic waves incident on the meta-surfaces 604 toward the same (or similar) target point within the vehicle 602. For example, as shown in FIG. 6A and by reference number 608, a meta-surface 604 on a windshield of the vehicle 602 may be configured to redirect an electromagnetic wave (EM1) transmitted by the network node 110 and incident on the meta-surface 604 toward a location of the UE 120 inside the vehicle 602. As shown by reference number 610, a meta-surface 604 on a sun roof of the vehicle 602 may also be configured to redirect an electromagnetic wave (EM2) transmitted by the network node 110 and incident on the meta-surface 604 toward the location of the UE 120 inside the vehicle 602. In this way, the meta-surfaces 604 may provide link enhancement for multiple paths between the network node and the in-vehicle UE 120 (e.g., as compared to a direct path with penetration loss).

Figure 6B:
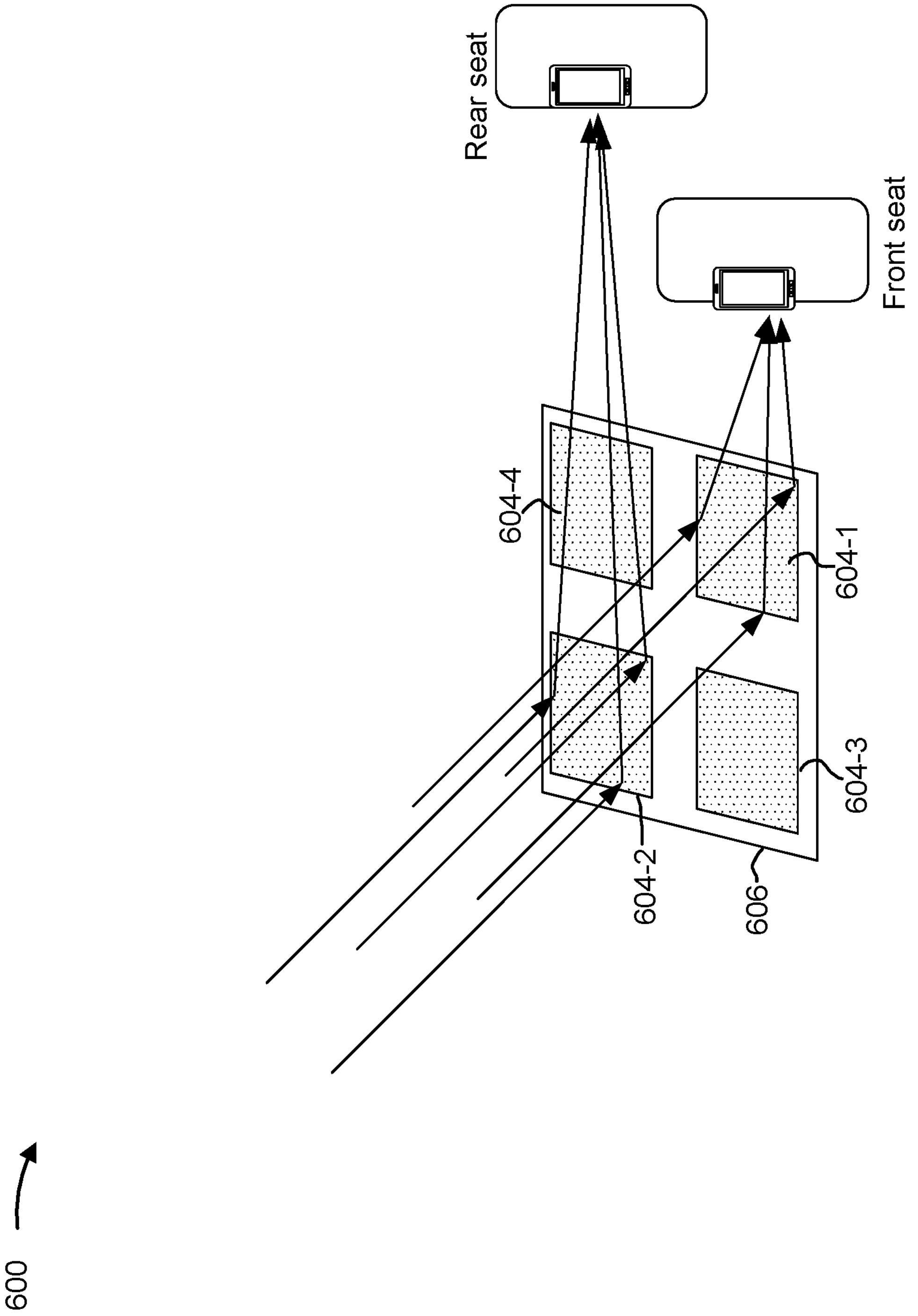

In some aspects, multiple meta-surfaces 604 disposed on the same glass surface 606 of the vehicle 602 may be configured to redirect incident electromagnetic waves toward different target points within the vehicle 602. As shown in FIG. 6B, multiple meta-surfaces 604, including a first meta-surface 604-1, a second meta-surface 604-2, a third meta-surface 604-3, and a fourth meta-surface 604-4 may be disposed on a glass surface 606 of the vehicle 602. The first meta-surface 604-1 may be configured to redirect electromagnetic waves incident on the first meta-surface 604-1 toward a first target point (e.g., an expected UE location in a front seat of the vehicle 602) and the second meta-surface 604-2 may be configured to redirect electromagnetic waves incident on the second meta-surface 604-2 toward a second target point (e.g., an expected UE location in a rear seat of the vehicle 602). In some aspects, different meta-surfaces 604 (e.g., different meta-surfaces 604 on the same glass surface 606 or on different glass surfaces 606) may be configured for different serving cell frequency bands. For example, the first meta-surface 604-1 may be configured to redirect electromagnetic waves in a first frequency band incident on the first meta-surface 604-1 toward the first target point (e.g., the expected UE location in a front seat of the vehicle 602), and the third meta-surface 604-3 may be configured to redirect electromagnetic waves in a second frequency band incident on the third meta-surface 604-3 toward the first target point. Additionally, or alternatively, the second meta-surface 604-2 may be configured to redirect electromagnetic waves in the first frequency band incident on the second meta-surface 604-2 toward the second target point (e.g., the expected UE location in a rear seat of the vehicle 602), and the fourth meta-surface 604-4 may be configured to redirect electromagnetic waves in the second frequency band incident on the fourth meta-surface 604-4 toward the second target point.

Returning to FIG. 6A, in some aspects, a given meta-surface 604 of the one or more meta-surfaces 604 may be configured to direct/redirect an electromagnetic wave incident on the meta-surface 604 with an angle of incidence (e.g., incident angle $\theta_i$) that is equal to a target incident angle or falls within a range of target incident angles toward a target point that is a fixed point inside the vehicle 602. In some aspects, the range of target incident angles may be associated with transmissions from one or more network nodes. In some aspects, a meta-surface 604 may be configured to direct/redirect such an incident electromagnetic wave (e.g., an electromagnetic wave incident on the meta-surface 604 with an angle of incidence that is equal to the target incident angle or falls within the range of target incident angles) toward any point inside the vehicle 602. In some aspects, in the case of a passive meta-surface, the configuration of a meta-surface 604 may be a static configuration achieved/configured by fabrication of the meta-surface 604. In this case, the meta-surface 604 may be pre-configured with one or more fabrication constants that achieve the static configuration that causes the meta-surface 604 to redirect electromagnetic waves incident with one or more target incident angles at a target transmission angle toward the target point within the vehicle 602. In some aspects, in the case of an RIS (e.g., a dynamic/actively controlled meta-surface), the configuration of the meta-surface 604 (e.g., to redirect electromagnetic waves with one or more target incident angles at a target transmission angle toward a target point within the vehicle 602) may be achieved/configured via an electrical control signal from a meta-surface control unit 612.

The meta-surface control unit 612 may include a control module (e.g., a controller and/or a processor) that is capable of applying an electrical control signal to a meta-surface 604 (e.g., an RIS) to dynamically configure the electromagnetic characteristics of each reconfigurable element (e.g., each meta-element) of the meta-surface 604 (e.g., the RIS) to achieve a target configuration for the meta-surface 604 (e.g., the RIS). In some aspects, the vehicle 602 may be equipped with one meta-surface control unit 612 that controls multiple meta-surfaces 604 (e.g., all of the one or more meta-surfaces 604 disposed on the glass surfaces 606 of the vehicle 602). In some aspects, the vehicle 602 may include multiple meta-surface control units 612 that control different meta-surfaces 604 or groups of meta-surfaces 604. In some aspects, the meta-surface control unit 612 may be included in a UE, such as in-vehicle telematics unit 630 shown in FIG. 6D and/or the in-vehicle UE 120. In some aspects, a UE (e.g., the in-vehicle telematics unit 630, the in-vehicle UE 120, or another UE) may communicate with the meta-surface control unit 612 to apply the electrical signal to dynamically configure the meta-surface 604 (e.g., the RIS).

Figure 6C:
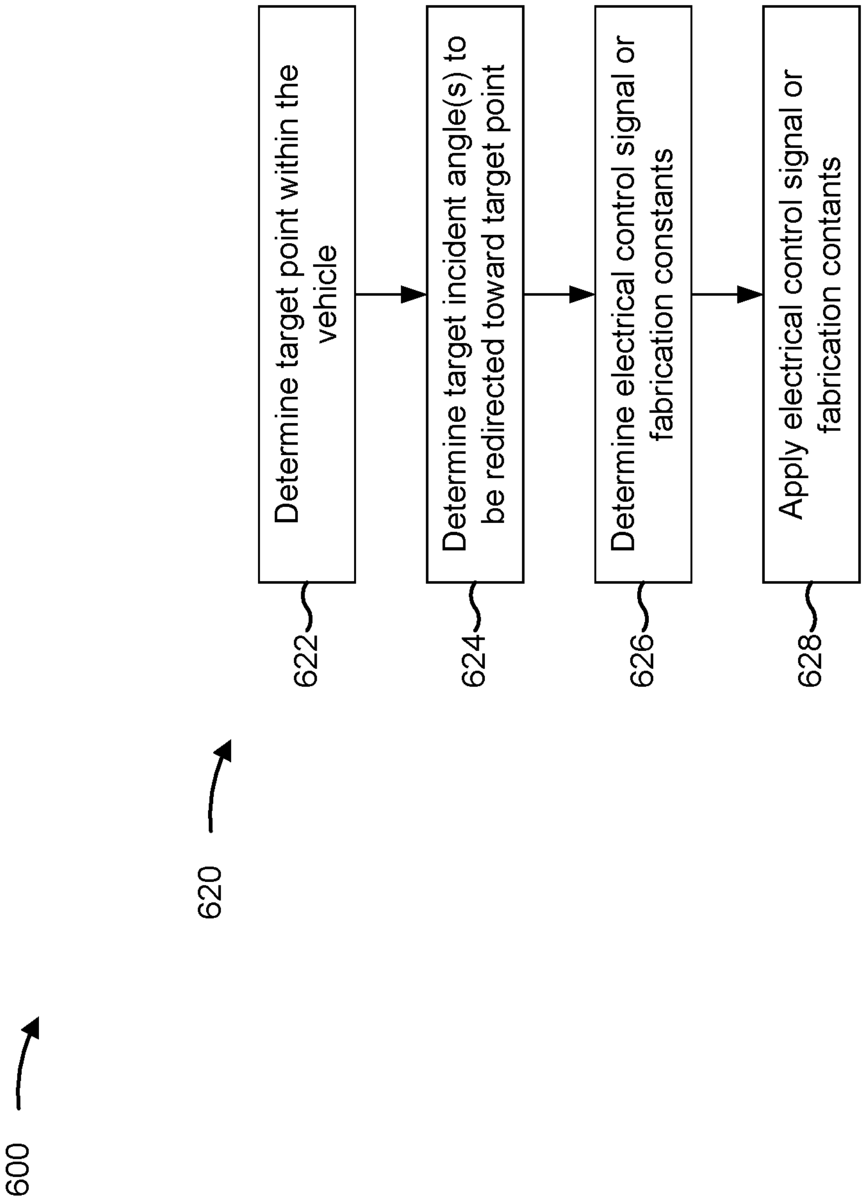

FIG. 6C shows an example process 620 for configuring a meta-surface 604. In some aspects, the process 620 may be performed by a UE (e.g., telematics unit 630 and/or UE 120) to dynamically configure the meta-surface 604 (e.g., an RIS) via electrical control. For example, the UE may include the meta-surface control unit 612, or the UE may communicate with the meta-surface control unit 612 to dynamically configure the meta-surface 604. In some other aspects, the process 620 may be performed to configure (e.g., pre-configure) the meta-surface 604 (e.g., a passive meta-surface) during manufacture or fabrication of the meta-surface 604. In some aspects, process 620 may be performed/repeated for each meta-surface 604 of the one or more meta-surfaces 604 disposed on the one or more glass surfaces 606 of the vehicle 602.

As shown in FIG. 6C, in some aspects, process 620 may include determining the target point within the vehicle 602 (block 622). The target point may be the point inside the vehicle 602 toward which the meta-surface directs/focuses an incident electromagnetic wave. For example, the target point within the vehicle 602 may be an expected UE location, a seat location, or a fixed location associated with an in-vehicle UE or in-vehicle telematics antenna. In some aspects, in the case in which the meta-surface 604 is an RIS, the UE (e.g., telematics unit 630 and/or UE 120) may determine the target point within the vehicle 602 for the meta-surface 604. In some aspects, in the case in which the meta-surface 604 is an RIS, the UE (e.g., telematics unit 630 and/or UE 120) may dynamically determine the target point in connection with a current location of the UE or another UE (e.g., a hand-held UE of a passenger) within the vehicle 602. In some aspects, the UE (e.g., telematics unit 630 and/or UE 120) may dynamically determine the target point based at least in part on the mobility of the vehicle 602. For example, the UE may determine whether the meta-surface 604 is to direct incident electromagnetic waves toward or away from a telematics antenna in connection with the mobility of the vehicle 602, as described in greater detail below in connection with FIG. 6D.

As further shown in FIG. 6C, in some aspects, process 620 may include determining one or more target incident angles to be redirected toward the target point by the meta-surface 604 (block 624). In some aspects, a target incident angle for an electromagnetic wave impinging on the meta-surface 604 may be determined. The target incident angle may be an incident angle at which an electromagnetic wave incident on the meta-surface 604 will be redirected toward the target point within the vehicle 602. In some aspects, a range of target incident angles for the electromagnetic wave impinging on the meta-surface 604 may be determined. The target range of incident angles may be a range of incident angles for which electromagnetic waves incident on the meta-surface 604 will be redirected toward the target point within the vehicle 602. In some aspects, in the case in which the meta-surface 604 is an RIS, the UE (e.g., telematics unit 630 and/or UE 120) may determine the target incident angle or the range of target incident angles for the meta-surface 604. In some aspects, the UE (e.g., telematics unit 630 and/or UE 120) may dynamically determine the target incident angle or the range of target incident angles based at least in part on a mobility of the vehicle 602. For example, based at least in part on the location of the meta-surface 604 on the vehicle 602 and the movement of the vehicle 602, the UE may determine or predict changes in the target incident angle(s) associated with electromagnetic waves transmitted by a network node (e.g., network node 110) of a serving cell.

As further shown in FIG. 6C, in some aspects, process 620 may include determining an electrical control signal or fabrication constants to configure the meta-surface 604 to redirect electromagnetic waves incident on the meta-surface 604 with an incident angle equal to the target incident angle or within the range of target incident angles toward the target point within the vehicle 602 (block 626). For example, an electrical control signal or fabrication constants may be determined to achieve an incidence-to-transmission angle mapping that maps incident electromagnetic waves with the target incident angle(s) to be redirected at a target transmission angle (e.g., toward the target point).

In some aspects, in the case in which the meta-surface 604 is a passive meta-surface, one or more fabrication constants may be configured to achieve the target configuration for the meta-surface 604. For example, the fabrication constants may include a meta-element size and/or a polarization transfer function, among other examples. The meta-element size may be a size of the meta-elements (e.g., meta-material structures) that make up the meta-surface 604. For example, the meta-element size may be on the order of 0.1-0.5 times the wavelength of the electromagnetic wave.

In some aspects, in the case in which the meta-surface 604 is an RIS, the UE (e.g., telematics unit 630 and/or UE 120) may determine the electrical control signal to be applied to the meta-surface 604 to achieve the target configuration for the meta-surface 604. In this case, the UE may determine a transfer function (e.g., a polarization transfer function) that redirects electromagnetic waves incident on the meta-surface 604 with an incident angle equal to the target incident angle or within the range of target incident angles at the target transmission angle toward the target point within the vehicle 602. The UE (e.g., telematics unit 630 and/or UE 120) and/or the meta-surface control unit 612 may then determine the electrical control signal to configure the meta-surface 604 with the transfer function. For example, the transfer function configured for an actively controlled meta-surface (e.g., an RIS) may be varied based on a voltage across each meta-element of the meta-surface 604. The UE and/or the meta-surface control unit 612 may determine an electrical control signal that applies voltages across the meta-elements of the meta-surface 604 to configure the meta-surface 604 with the target transfer function.

In some aspects, a first UE (e.g., the in-vehicle telematics unit 630 and/or the meta-surface control unit 612) may determine the transfer function that redirects electromagnetic waves incident on the meta-surface with an incident angle equal to the target incident angle or within the range of target incident angles toward the target point within the vehicle based at least in part on one or more communications with a second UE. For example, the first UE may determine transfer function, the target incident angle or range of target incident angles, and/or the target point based at least in part on an explicit message exchange with the second. In this case, the first UE may be the meta-surface control unit 612 or a vehicle UE (e.g., the in-vehicle telematics unit 630) that includes and/or controls the meta-surface control unit 612, and the second UE may be another UE located in the vehicle that communicates with the first UE to boost the signal on a link. For example, the second UE may communicate with the first UE via sidelink, Bluetooth, or another D2D communication protocol.

As further shown in FIG. 6C, in some aspects, process 620 may include applying the electrical control signal or the fabrication constants to configure the meta-surface 604 (block 628). In some aspects, in the case in which the meta-surface 604 is a passive meta-surface, the meta-surface 604 may be fabricated with the one or more fabrication constants configured to redirect an electromagnetic wave incident on the meta-surface 604 with an incident angle equal to the target incident angle or within the range of target incident angles toward the target point within the vehicle 602.

In some aspects, in the case in which the meta-surface 604 is an RIS, the UE (e.g., telematics unit 630 and/or UE 120) and/or the meta-surface control unit 612 may control the meta-surface 604, via the electrical control signal, to configure the meta-surface 604 to redirect electromagnetic waves incident on the meta-surface 604 in accordance with the transfer function. That is, the UE (e.g., telematics unit 630 and/or UE 120) and/or the meta-surface control unit 612 may control the meta-surface 604, via the electrical control signal, to configure the meta-surface 604, in accordance with the determined transfer function, to redirect electromagnetic waves incident on the meta-surface 604 with an incident angle equal to the target incident angle or within the range of target incident angles toward the target point within the vehicle 602. In some aspects, in a case in which the meta-surface control unit 612 is included in the UE (e.g., telematics unit 630 and/or UE 120), the UE may apply the electrical control signal to the meta-surface 604 to configure the meta-surface 604 with the transfer function. In some aspects, in a case in which the meta-surface control unit 612 is not included in the UE, the UE may communicate with the meta-surface control unit 612 to control the meta-surface control unit 612 to apply the electrical control signal to the meta-surface 604 to configure the meta-surface 604 with the transfer function.

Figure 6D:
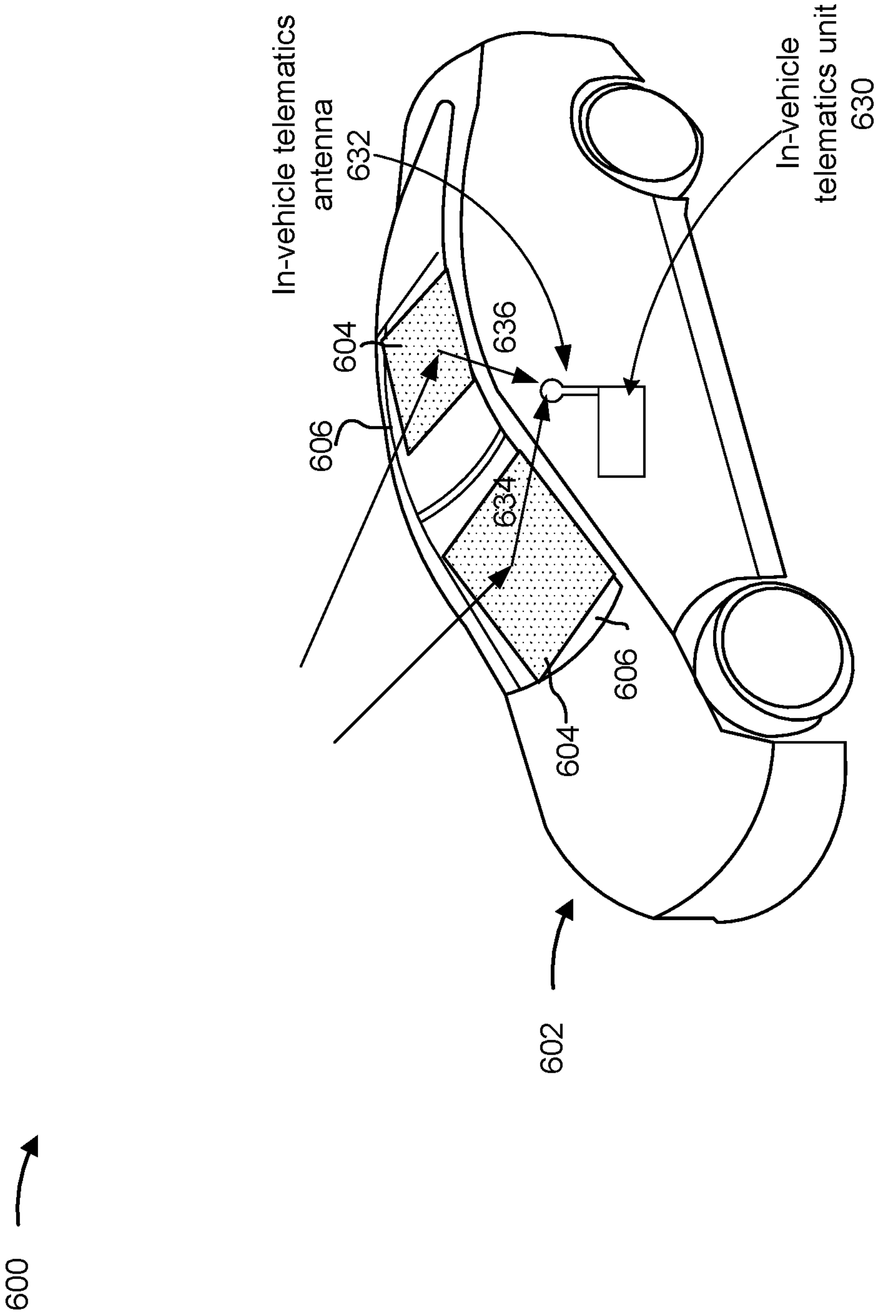

As shown in FIG. 6D, in some aspects, the vehicle 602 may be equipped with an in-vehicle telematics unit 630 and an in-vehicle telematics antenna 632 connected to the in-vehicle telematics unit 630. The in-vehicle telematics unit 630 and the in-vehicle telematics antenna 632 are located inside the vehicle 602. The in-vehicle telematics unit 630 may track/monitor various information relating to the vehicle 602, such as location-based information (e.g., geographic location, acceleration, and/or speed, among other examples), vehicle specific information (e.g., fuel level, fuel consumption, and/or vehicle status, among other examples), and/or other information relating to the vehicle 602, and may communicate the information via a wireless network (e.g., via communications with a network node). In some aspects, the in-vehicle telematics unit 630 may be a UE (e.g., UE 120), may be included in a UE, or may include a UE. In some aspects, an in-vehicle telematics device may include the in-vehicle telematics unit 630 and the in-vehicle telematics antenna 632. In this case, the in-vehicle telematics device may be a UE (e.g., UE 120), may be included in a UE, or may include a UE. In some aspects, the in-vehicle telematics unit 630 and/or the in-vehicle telematics device may include the meta-surface control unit 612 (shown in FIG. 6A).

As further shown in FIG. 6D, the one or more meta-surfaces 604 disposed on the glass surfaces 606 of the vehicle 602 may include at least one meta-surface 604 configured to direct electromagnetic waves incident on the at least one meta-surface 604 toward the in-vehicle telematics antenna 632. For example, the target point within the vehicle 602 for one or more of the meta-surfaces 604 may be a target point associated with a location of the in-vehicle telematics antenna 632. In this case, one or more of the meta-surfaces 604 may be configured (e.g., via fabrication or dynamically configured via an electrical control signal) to redirect certain incident electromagnetic waves (e.g., electromagnetic waves with an incident angle equal to the target incident angle or within the range of target incident angles) toward the in-vehicle telematics antenna 632. For example, as shown by reference number 634, a meta-surface 604 on a glass surface 606 (e.g., the windshield) of the vehicle 602 may be configured to redirect electromagnetic waves incident on the meta-surface 604 toward the in-vehicle telematics antenna 632. As shown by reference number 636, a meta-surface 604 on another glass surface 606 (e.g., the sun roof) of the vehicle 602 may also be configured to redirect electromagnetic waves incident on the meta-surface 604 toward the in-vehicle telematics antenna 632. In this way, one or more of the meta-surfaces 604 disposed on the glass surfaces 606 of the vehicle 602 may be configured to provide a signal boost to the in-vehicle telematics antenna 632.

In some aspects, at least one meta-surface 604 of the one or more meta-surfaces 604 disposed on the glass surfaces 606 of the vehicle 602 may be configured to redirect electromagnetic waves incident on the at least one meta-surface 604 away from the in-vehicle telematics antenna 632. In this case, one or more of the meta-surfaces 604 may be configured (e.g., via fabrication or dynamically configured via an electrical control signal) to redirect certain incident electromagnetic waves (e.g., electromagnetic waves with an incident angle equal to the target incident angle or within the range of target incident angles) away from the in-vehicle telematics antenna 632. In this way, one or more of the meta-surfaces 604 disposed on the glass surfaces 606 of the vehicle 602 may be configured to reduce interference to the in-vehicle telematics antenna 632.

In some aspects, at least one meta-surface 604 may be configured to redirect incident electromagnetic waves toward the in-vehicle telematics antenna 632, and at least one other meta-surface 604 may be configured to redirect incident electromagnetic waves away from the in-vehicle telematics antenna 632. For example, at least one meta-surface 604 on one glass surface 606 (e.g., a first glass surface) of the vehicle 602 may be configured to redirect incident electromagnetic waves toward the in-vehicle telematics antenna 632, and at least one other meta-surface 604 on another glass surface 606 (e.g., a second glass surface) of the vehicle 602 may be configured to redirect incident electromagnetic waves away from the in-vehicle telematics antenna 632. Additionally, or alternatively, at least one meta-surface 604 on a glass surface 606 of the vehicle 602 may be configured to redirect incident electromagnetic waves with a first angle of incidence (or within a first range of angles of incidence) or in a first frequency band toward the in-vehicle telematics antenna 632, and at least one other meta-surface 604 on the same glass surface 606 of the vehicle 602 may be configured to redirect incident electromagnetic waves with a second angle of incidence (or within a second range of angles of incidence) or in a second frequency band away from the in-vehicle telematics antenna 632 (for example, as described in connection with FIG. 6B). In some aspects, a UE (e.g., the in-vehicle telematics unit 630) may control different meta-surfaces 604 to redirect incident electromagnetic waves toward the in-vehicle telematics antenna 632 or away from the in-vehicle telematics antenna 632 based at least in part on the glass surfaces 606 on which the different meta-surfaces 604 are disposed and directions from which electromagnetic waves are received from different network nodes. For example, based at least in part on the mobility of the vehicle 602, the UE (e.g., the in-vehicle telematics unit 630) may configure one or more meta-surfaces 604 on a glass surface 606 facing a first direction associated with a first network node to redirect incident electromagnetic waves toward the in-vehicle telematics antenna 632 in order to provide a signal boost for the electromagnetic waves from the first network node. Additionally, or alternatively, based at least in part on the mobility of the vehicle 602, the UE (e.g., the in-vehicle telematics unit 630) may configure one or more meta-surfaces 604 on a glass surface 606 facing a second direction associated with a second network node to redirect incident electromagnetic waves away from the in-vehicle telematics antenna 632 in order to reduce interference with in-vehicle telematics antenna 632 from the electromagnetic waves from the second network node. The UE (e.g., the in-vehicle telematics unit 630) may control the meta-surfaces 604 by dynamically configuring the meta-surfaces 604 via an electrical control signal, as described above in connection with FIG. 6C.

As indicated above, FIGS. 6A-6D are provided as an example. Other examples may differ from what is described with respect to FIGS. 6A-6D.

Figure 7:
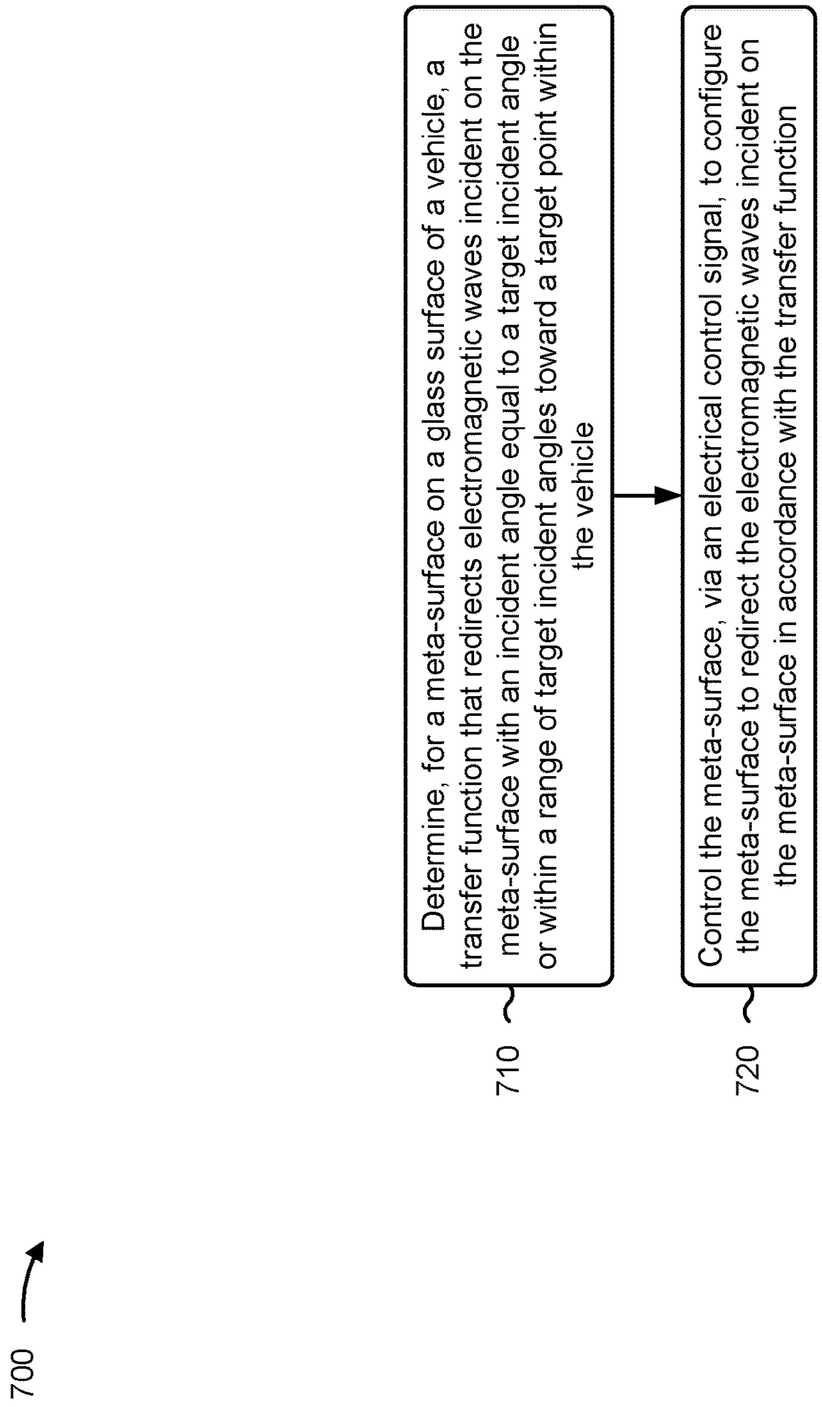
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120 and/or telematics unit 630) performs operations associated with meta-surface enabled in-vehicle link enhancement.

As shown in FIG. 7, in some aspects, process 700 may include determining, for a meta-surface on a glass surface of a vehicle, a transfer function that redirects electromagnetic waves incident on the meta-surface with an incident angle equal to a target incident angle or within a range of target incident angles toward a target point within the vehicle (block 710). For example, the UE (e.g., using communication manager 140 and/or determination component 808, depicted in FIG. 8) may determine, for a meta-surface on a glass surface of a vehicle, a transfer function that redirects electromagnetic waves incident on the meta-surface with an incident angle equal to a target incident angle or within a range of target incident angles toward a target point within the vehicle, as described above.

As further shown in FIG. 7, in some aspects, process 700 may include controlling the meta-surface, via an electrical control signal, to configure the meta-surface to redirect the electromagnetic waves incident on the meta-surface in accordance with the transfer function (block 720). For example, the UE (e.g., using communication manager 140 and/or meta-surface control component 810, depicted in FIG. 8) may control the meta-surface, via an electrical control signal, to configure the meta-surface to redirect the electromagnetic waves incident on the meta-surface in accordance with the transfer function, as described above.

Process 700 may include additional aspects, such as any single aspect or any combination of aspects described below and/or in connection with one or more other processes described elsewhere herein.

In a first aspect, process 700 includes determining the target incident angle or the range of target incident angles.

In a second aspect, alone or in combination with the first aspect, determining the target incident angle of the range of target incident angles includes determining the target incident angle or the range of target incident angles based at least in part on a mobility of the vehicle.

In a third aspect, alone or in combination with one or more of the first and second aspects, process 700 includes determining the target point within the vehicle.

In a fourth aspect, alone or in combination with one or more of the first through third aspects, determining the transfer function includes determining the transfer function that redirects the electromagnetic waves incident on the meta-surface with the incident angle equal to the target incident angle or within the range of target incident angles toward the target point within the vehicle based at least in part on one or more communications with another UE.

In a fifth aspect, alone or in combination with one or more of the first through fourth aspects, the meta-surface has a transparency level that satisfies a transparency threshold associated with the glass surface of the vehicle.

In a sixth aspect, alone or in combination with one or more of the first through fifth aspects, the meta-surface is a reconfigurable intelligent surface (RIS).

In a seventh aspect, alone or in combination with one or more of the first through sixth aspects, determining the transfer function includes determining, for a first meta-surface on the glass surface of the vehicle, a first transfer function that redirects electromagnetic waves incident on the first meta-surface toward a first target point within the vehicle, and determining, for a second meta-surface on the glass surface of the vehicle, a second transfer function that redirects electromagnetic waves incident on the second meta-surface toward a second target point within the vehicle, and controlling the meta-surface includes controlling the first meta-surface to configure the first meta-surface to redirect the electromagnetic waves incident on the first meta-surface toward the first target point in accordance with the first transfer function, and controlling the second meta-surface to configure the second meta-surface to redirect the electromagnetic waves incident on the second meta-surface toward the second target point in accordance with the second transfer function.

In an eighth aspect, alone or in combination with one or more of the first through seventh aspects, determining the transfer function includes determining, for a first meta-surface on the glass surface of the vehicle, a first transfer function that redirects electromagnetic waves in a first frequency band incident on the first meta-surface toward the target point within the vehicle, and determining, for a second meta-surface on the glass surface of the vehicle, a second transfer function that redirects electromagnetic waves in a second frequency band incident on the second meta-surface toward the target point within the vehicle, and controlling the meta-surface includes controlling the first meta-surface to configure the first meta-surface to redirect the electromagnetic waves in the first frequency band incident on the first meta-surface toward the target point in accordance with the first transfer function, and controlling the second meta-surface to configure the second meta-surface to redirect the electromagnetic waves in the second frequency band incident on the second meta-surface toward the target point in accordance with the second transfer function.

In a ninth aspect, alone or in combination with one or more of the first through eighth aspects, the one or more target points include a target point associated with a UE.

In a tenth aspect, alone or in combination with one or more of the first through ninth aspects, the one or more target points include one or more target points corresponding to one or more expected in-vehicle UE positions.

In an eleventh aspect, alone or in combination with one or more of the first through tenth aspects, the one or more target points include one or more target points corresponding to one or more seats within the vehicle.

In a twelfth aspect, alone or in combination with one or more of the first through eleventh aspects, the one or more target points include a target point associated with an in-vehicle telematics antenna.

In a thirteenth aspect, alone or in combination with one or more of the first through twelfth aspects, process 700 includes controlling another meta-surface to configure the other meta-surface to redirect electromagnetic waves incident on the other meta-surface away from the target point.

In a fourteenth aspect, alone or in combination with one or more of the first through thirteenth aspects, the other meta-surface is disposed on a different glass surface of the vehicle from the meta-surface.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
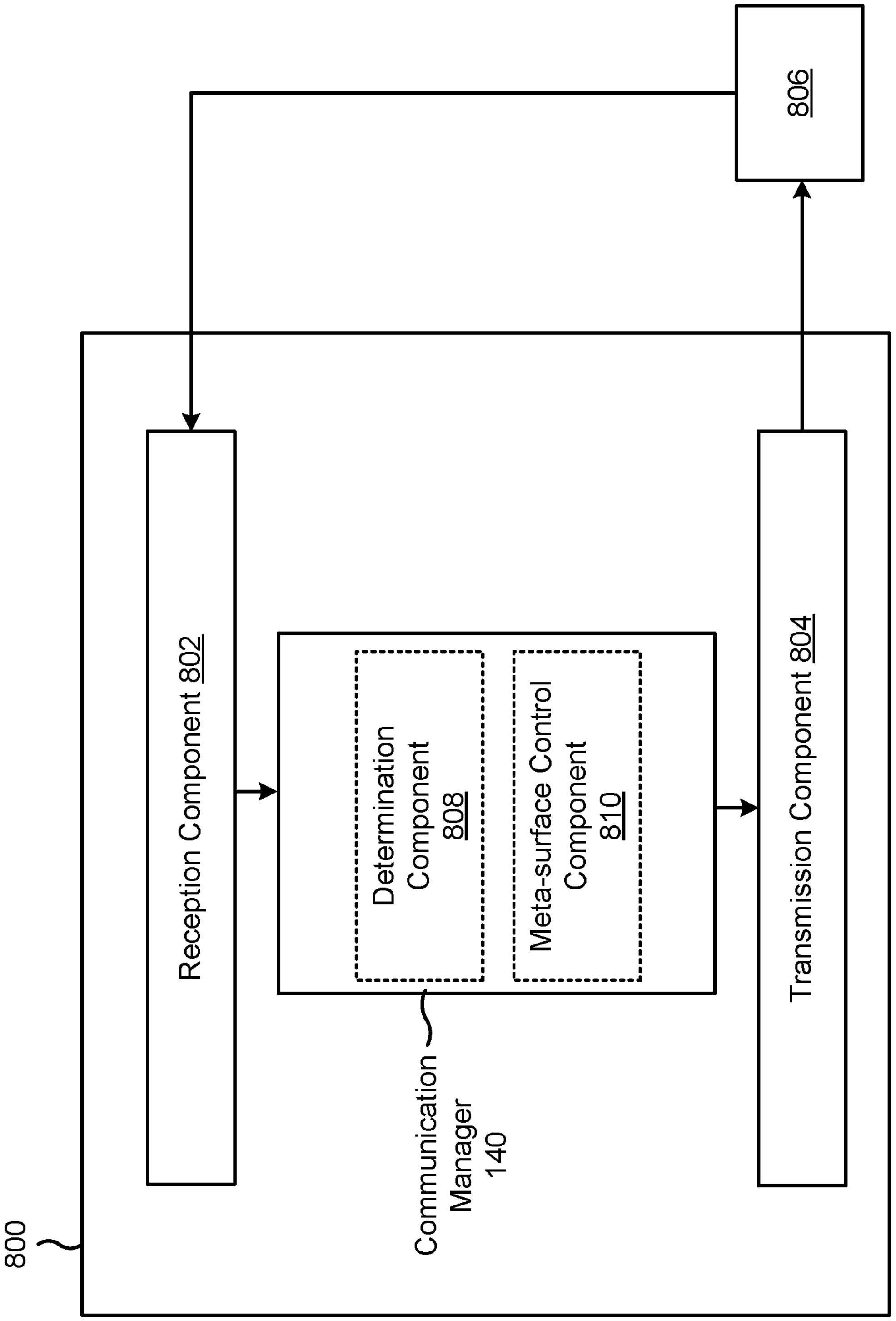
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include one or more of a determination component 808 and/or a meta-surface control component 810, among other examples.

In some aspects, the apparatus 800 may be configured to perform one or more operations described herein in connection with FIGS. 6A-6D. Additionally, or alternatively, the apparatus 800 may be configured to perform one or more processes described herein, such as process 620 of FIG. 6C, process 700 of FIG. 7, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The determination component 808 may determine, for a meta-surface on a glass surface of a vehicle, a transfer function that redirects electromagnetic waves incident on the meta-surface with an incident angle equal to a target incident angle or within a range of target incident angles toward a target point within the vehicle. The meta-surface control component 810 may control the meta-surface, via an electrical control signal, to configure the meta-surface to redirect the electromagnetic waves incident on the meta-surface in accordance with the transfer function.

The determination component 808 may determine the target incident angle or the range of target incident angles.

The determination component 808 may determine the target point within the vehicle.

The meta-surface control component 810 may control another meta-surface to configure the other meta-surface to redirect electromagnetic waves incident on the other meta-surface away from the target point.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: An apparatus of a vehicle, comprising: one or more meta-surfaces disposed on one or more glass surfaces of the vehicle, the one or more meta-surfaces configured to redirect electromagnetic waves incident on the one or more meta-surfaces toward one or more target points within the vehicle.

Aspect 2: The apparatus of Aspect 1, wherein each meta-surface, of the one or more meta-surfaces, has a respective transparency level that satisfies a transparency threshold associated with a glass surface, of the one or more glass surfaces of the vehicle, on which the meta-surface is disposed.

Aspect 3: The apparatus of any of Aspects 1-2, wherein the one or more meta-surfaces include at least one passive meta-surface with one or more fabrication constants configured to redirect an electromagnetic wave incident on the at least one passive meta-surface with an incident angle equal to a target incident angle or within a range of target incident angles associated with transmissions from one or more network nodes toward a target point of the one or more target points within the vehicle.

Aspect 4: The apparatus of Aspect 3, wherein the one or more fabrication constants include at least one of a meta-element size or a polarization transfer function.

Aspect 5: The apparatus of any of Aspects 1-4, wherein the one or more meta-surfaces include at least one reconfigurable intelligent surface (RIS) configured, via an electrical control signal, to redirect an electromagnetic wave incident on the at least one RIS with an incident angle equal to a target incident angle or within a range of target incident angles associated with transmissions from one or more network nodes toward a target point of the one or more target points within the vehicle.

Aspect 6: The apparatus of Aspect 5, further comprising: a meta-surface control unit comprising one or more processors configured to control, via the electrical control signal, a configuration of the at least one RIS to configure the at least one RIS to redirect the electromagnetic wave incident on the at least one RIS toward the target point of the one or more target points within the vehicle.

Aspect 7: The apparatus of Aspect 6, wherein the one or more processors of the meta-surface control unit, to control the configuration of the at least one RIS, are configured to: determine the target incident angle or the range of target incident angles; determine a transfer function to redirect the electromagnetic wave incident on the at least one RIS with the incident angle equal to the target incident angle or within the range of target incident angles toward the target point of the one or more target points within the vehicle; and apply the electrical control signal to the at least one RIS to configure the at least one RIS with the transfer function.

Aspect 8: The apparatus of any of Aspects 1-7, wherein the one or more meta-surfaces include multiple meta-surfaces disposed on a same glass surface of the vehicle.

Aspect 9: The apparatus of Aspect 8, wherein the multiple meta-surfaces disposed on the same glass surface of the vehicle include: a first meta-surface configured to redirect electromagnetic waves in a first frequency band incident on the first meta-surface toward a target point of the one or more target points in the vehicle; and a second meta-surface configured to redirect electromagnetic waves in a second frequency band incident on the second meta-surface toward the target point of the one or more target points in the vehicle.

Aspect 10: The apparatus of any of Aspects 8-9, wherein the multiple meta-surfaces disposed on the same glass surface of the vehicle include: a first meta-surface configured to redirect electromagnetic waves in a first frequency band incident on the first meta-surface toward a target point of the one or more target points in the vehicle; and a second meta-surface configured to redirect electromagnetic waves in a second frequency band incident on the second meta-surface toward the target point of the one or more target points in the vehicle.

Aspect 11: The apparatus of any of Aspects 1-10, wherein the one or more target points include a target point associated with a user equipment (UE).

Aspect 12: The apparatus of any of Aspects 1-11, wherein the one or more target points include one or more target points corresponding to one or more expected in-vehicle user equipment (UE) positions.

Aspect 13: The apparatus of any of Aspects 1-12, wherein the one or more target points include one or more target points corresponding to one or more seats within the vehicle.

Aspect 14: The apparatus of any of Aspects 1-13, wherein the one or more target points include a target point associated with an in-vehicle telematics antenna.

Aspect 15; An apparatus of a vehicle, comprising: an in-vehicle telematics unit; an in-vehicle telematics antenna connected to the in-vehicle telematics unit; and one or more meta-surfaces disposed on one or more glass surfaces of the vehicle, the one or more meta-surfaces including at least one meta-surface configured to redirect electromagnetic waves incident on the at least one meta-surface toward the in-vehicle telematics antenna.

Aspect 16: The apparatus of Aspect 15, wherein the one or more meta-surfaces include at least one other meta-surface configured to redirect electromagnetic waves incident on the at least one other meta-surface away from the in-vehicle telematics antenna.

Aspect 17: The apparatus of Aspect 16, wherein the at least one meta-surface configured to redirect electromagnetic waves incident on the at least one meta-surface toward the in-vehicle telematics antenna is disposed on a first glass surface of the vehicle, and wherein the at least one other meta-surface configured to redirect electromagnetic waves incident on the at least one other meta-surface away from the in-vehicle telematics antenna is disposed on a second glass surface of the vehicle.

Aspect 18: A method of wireless communication performed by an apparatus of a user equipment (UE), comprising: determining, for a meta-surface on a glass surface of a vehicle, a transfer function that redirects electromagnetic waves incident on the meta-surface with an incident angle equal to a target incident angle or within a range of target incident angles toward a target point within the vehicle; and controlling the meta-surface, via an electrical control signal, to configure the meta-surface to redirect the electromagnetic waves incident on the meta-surface in accordance with the transfer function.

Aspect 19: The method of Aspect 18, further comprising: determining the target incident angle or the range of target incident angles.

Aspect 20: The method of Aspect 19, wherein determining the target incident angle of the range of target incident angles comprises: determining the target incident angle or the range of target incident angles based at least in part on a mobility of the vehicle.

Aspect 21: The method of any of Aspects 19-20, further comprising: determining the target point within the vehicle.

Aspect 22: The method of any of Aspects 18-21, wherein determining the transfer function comprises: determining the transfer function that redirects the electromagnetic waves incident on the meta-surface with the incident angle equal to the target incident angle or within the range of target incident angles toward the target point within the vehicle based at least in part on one or more communications with another UE.

Aspect 23: The method of any of Aspects 18-22, wherein the meta-surface has a transparency level that satisfies a transparency threshold associated with the glass surface of the vehicle.

Aspect 24: The method of any of Aspects 18-23, wherein the meta-surface is a reconfigurable intelligent surface (RIS).

Aspect 25: The method of any of Aspects 18-24, wherein determining the transfer function comprises: determining, for a first meta-surface on the glass surface of the vehicle, a first transfer function that redirects electromagnetic waves incident on the first meta-surface toward a first target point within the vehicle, and determining, for a second meta-surface on the glass surface of the vehicle, a second transfer function that redirects electromagnetic waves incident on the second meta-surface toward a second target point within the vehicle; and wherein controlling the meta-surface comprises: controlling the first meta-surface to configure the first meta-surface to redirect the electromagnetic waves incident on the first meta-surface toward the first target point in accordance with the first transfer function, and controlling the second meta-surface to configure the second meta-surface to redirect the electromagnetic waves incident on the second meta-surface toward the second target point in accordance with the second transfer function.

Aspect 26: The method of any of Aspects 18-25, wherein determining the transfer function comprises: determining, for a first meta-surface on the glass surface of the vehicle, a first transfer function that redirects electromagnetic waves in a first frequency band incident on the first meta-surface toward the target point within the vehicle, and determining, for a second meta-surface on the glass surface of the vehicle, a second transfer function that redirects electromagnetic waves in a second frequency band incident on the second meta-surface toward the target point within the vehicle; and wherein controlling the meta-surface comprises: controlling the first meta-surface to configure the first meta-surface to redirect the electromagnetic waves in the first frequency band incident on the first meta-surface toward the target point in accordance with the first transfer function, and controlling the second meta-surface to configure the second meta-surface to redirect the electromagnetic waves in the second frequency band incident on the second meta-surface toward the target point in accordance with the second transfer function.

Aspect 27: The method of any of Aspects 18-26, wherein the target point is a location associated with a user equipment (UE).

Aspect 28: The method of any of Aspects 18-27, wherein the target point corresponds to an expected in-vehicle user equipment (UE) position.

Aspect 29: The method of any of Aspects 18-28, wherein the target point corresponds a seat within the vehicle.

Aspect 30: The method of any of Aspects 18-29, wherein the target point is associated with an in-vehicle telematics antenna.

Aspect 31: The method of Aspect 30, further comprising: controlling an other meta-surface to configure the other meta-surface to redirect electromagnetic waves incident on the other meta-surface away from the target point.

Aspect 32: The method of Aspect 31, wherein the other meta-surface is disposed on a different glass surface of the vehicle from the meta-surface.

Aspect 33: An apparatus for wireless communication at a device, comprising a processor; memory coupled with the processor; and instructions stored in the memory and executable by the processor to cause the apparatus to perform the method of one or more of Aspects 18-32.

Aspect 34: A device for wireless communication, comprising a memory and one or more processors coupled to the memory, the one or more processors configured to perform the method of one or more of Aspects 18-32.

Aspect 35: An apparatus for wireless communication, comprising at least one means for performing the method of one or more of Aspects 18-32.

Aspect 36: A non-transitory computer-readable medium storing code for wireless communication, the code comprising instructions executable by a processor to perform the method of one or more of Aspects 18-32.

Aspect 37: A non-transitory computer-readable medium storing a set of instructions for wireless communication, the set of instructions comprising one or more instructions that, when executed by one or more processors of a device, cause the device to perform the method of one or more of Aspects 18-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus of a vehicle, comprising:

one or more meta-surfaces disposed on one or more glass surfaces of the vehicle, at least one meta-surface of the one or more meta-surfaces being configurable to redirect electromagnetic waves incident on the at least one meta-surface toward and away from one or more target points within the vehicle; and a meta-surface control unit comprising one or more processors configured to dynamically control, via an electrical control signal, a configuration of the at least one meta-surface to redirect the electromagnetic waves toward the one or more target points or away from the one or more target points based at least in part on a glass surface, of the one or more glass surfaces, on which the least one meta-surface is disposed and a direction from which the electromagnetic waves are received.

2. The apparatus of claim 1, wherein each meta-surface, of the one or more meta-surfaces, has a respective transparency level that satisfies a transparency threshold associated with a glass surface, of the one or more glass surfaces of the vehicle, on which the meta-surface is disposed.

3. The apparatus of claim 1, wherein the one or more meta-surfaces include at least one passive meta-surface with one or more fabrication constants configured to redirect an electromagnetic wave incident on the at least one passive meta-surface with an incident angle equal to a target incident angle or within a range of target incident angles associated with transmissions from one or more network nodes toward a target point of the one or more target points within the vehicle.

4. The apparatus of claim 3, wherein the one or more fabrication constants include at least one of a meta-element size or a polarization transfer function.

5. The apparatus of claim 1, wherein the one or more meta-surfaces include at least one reconfigurable intelligent surface (RIS) configured, via the electrical control signal, to redirect an electromagnetic wave incident on the at least one RIS with an incident angle equal to a target incident angle or within a range of target incident angles associated with transmissions from one or more network nodes toward a target point of the one or more target points within the vehicle.

6. The apparatus of claim 5, wherein the meta-surface control unit is configured to control, via the electrical control signal, a configuration of the at least one RIS to configure the at least one RIS to redirect the electromagnetic wave incident on the at least one RIS toward the target point of the one or more target points within the vehicle.

7. The apparatus of claim 6, wherein the one or more processors of the meta-surface control unit, to control the configuration of the at least one RIS, are configured to:

determine a transfer function to redirect the electromagnetic wave incident on the at least one RIS with the incident angle equal to the target incident angle or within the range of target incident angles toward the target point of the one or more target points within the vehicle; and apply the electrical control signal to the at least one RIS to configure the at least one RIS with the transfer function.

8. The apparatus of claim 1, wherein the one or more meta-surfaces include multiple meta-surfaces disposed on a same glass surface of the vehicle.

9. The apparatus of claim 8, wherein the multiple meta-surfaces disposed on the same glass surface of the vehicle include:

a first meta-surface configured to redirect electromagnetic waves incident on the first meta-surface toward a first target point in the vehicle; and a second meta-surface configured to redirect electromagnetic waves incident on the second meta-surface toward a second target point in the vehicle.

10. The apparatus of claim 8, wherein the multiple meta-surfaces disposed on the same glass surface of the vehicle include:

a first meta-surface configured to redirect electromagnetic waves in a first frequency band incident on the first meta-surface toward a target point of the one or more target points in the vehicle; and a second meta-surface configured to redirect electromagnetic waves in a second frequency band incident on the second meta-surface toward the target point of the one or more target points in the vehicle.

11. The apparatus of claim 1, wherein the one or more target points include a target point associated with a user equipment (UE).

12. The apparatus of claim 1, wherein the one or more target points include one or more target points corresponding to one or more expected in-vehicle user equipment (UE) positions.

13. The apparatus of claim 1, wherein the one or more target points include one or more target points corresponding to one or more seats within the vehicle.

14. The apparatus of claim 1, wherein the one or more target points include a target point associated with an in-vehicle telematics antenna.

15. An apparatus of a vehicle, comprising:

an in-vehicle telematics unit;

an in-vehicle telematics antenna connected to the in-vehicle telematics unit;

one or more meta-surfaces disposed on one or more glass surfaces of the vehicle, the one or more meta-surfaces including at least one meta-surface configurable to redirect electromagnetic waves incident on the at least one meta-surface toward and away from the in-vehicle telematics antenna; and a meta-surface control unit comprising one or more processors configured to dynamically control, via an electrical control signal, a configuration of the at least one meta-surface to redirect the electromagnetic waves toward the in-vehicle telematics antenna or away from the in-vehicle telematics antenna based at least in part on a glass surface, of the one or more glass surfaces, on which the least one meta-surface is disposed and a direction from which the electromagnetic waves are received.

16. The apparatus of claim 15, wherein the at least one meta-surface includes a first meta-surface configured to redirect electromagnetic waves incident on the first meta-surface away from the in-vehicle telematics antenna and a second meta-surface configured to redirect electromagnetic waves incident on the second meta-surface away from the in-vehicle telematics antenna.

17. The apparatus of claim 16, wherein the second meta-surface is dynamically configured to redirect electromagnetic waves incident on the second meta-surface toward the in-vehicle telematics antenna based on the second meta-surface being disposed on a first glass surface of the vehicle that faces a first direction, and wherein the first meta-surface is dynamically configured to redirect electromagnetic waves incident on the first meta-surface away from the in-vehicle telematics antenna based on the first meta-surface being disposed on a second glass surface of the vehicle that faces a second direction.

18. A method of wireless communication performed by an apparatus of a user equipment (UE), comprising:

determining, for a meta-surface on a glass surface of a vehicle, a transfer function that redirects electromagnetic waves incident on the meta-surface with an incident angle equal to a target incident angle or within a range of target incident angles toward or away from a target point within the vehicle based at least in part on a glass surface on which the meta-surface is disposed and a direction from which the electromagnetic waves are received; and controlling the meta-surface, via an electrical control signal, to dynamically configure the meta-surface to redirect the electromagnetic waves incident on the meta-surface in accordance with the transfer function.

19. The method of claim 18, further comprising:

determining the target incident angle or the range of target incident angles.

20. The method of claim 19, wherein determining the target incident angle of the range of target incident angles comprises:

determining the target incident angle or the range of target incident angles based at least in part on a mobility of the vehicle.

21. The method of claim 19, further comprising:

determining the target point within the vehicle.

22. The method of claim 18, wherein determining the transfer function comprises:

determining the transfer function that redirects the electromagnetic waves incident on the meta-surface with the incident angle equal to the target incident angle or within the range of target incident angles toward the target point within the vehicle based at least in part on one or more communications with another UE.

23. The method of claim 18, wherein the meta-surface has a transparency level that satisfies a transparency threshold associated with the glass surface of the vehicle.

24. The method of claim 18, wherein the meta-surface is a reconfigurable intelligent surface (RIS).

25. The method of claim 18, wherein determining the transfer function comprises:

determining, for a first meta-surface on the glass surface of the vehicle, a first transfer function that redirects electromagnetic waves incident on the first meta-surface toward a first target point within the vehicle, and determining, for a second meta-surface on the glass surface of the vehicle, a second transfer function that redirects electromagnetic waves incident on the second meta-surface toward a second target point within the vehicle; and wherein controlling the meta-surface comprises:

controlling the first meta-surface to configure the first meta-surface to redirect the electromagnetic waves incident on the first meta-surface toward the first target point in accordance with the first transfer function, and controlling the second meta-surface to configure the second meta-surface to redirect the electromagnetic waves incident on the second meta-surface toward the second target point in accordance with the second transfer function.

26. The method of claim 18, wherein determining the transfer function comprises:

determining, for a first meta-surface on the glass surface of the vehicle, a first transfer function that redirects electromagnetic waves in a first frequency band incident on the first meta-surface toward the target point within the vehicle, and determining, for a second meta-surface on the glass surface of the vehicle, a second transfer function that redirects electromagnetic waves in a second frequency band incident on the second meta-surface toward the target point within the vehicle; and wherein controlling the meta-surface comprises:

controlling the first meta-surface to configure the first meta-surface to redirect the electromagnetic waves in the first frequency band incident on the first meta-surface toward the target point in accordance with the first transfer function, and controlling the second meta-surface to configure the second meta-surface to redirect the electromagnetic waves in the second frequency band incident on the second meta-surface toward the target point in accordance with the second transfer function.

27. The method of claim 18, wherein the target point corresponds to an expected in-vehicle user equipment (UE) position.

28. The method of claim 18, wherein the target point is associated with an in-vehicle telematics antenna.

29. The method of claim 28, further comprising:

controlling an other meta-surface to configure the other meta-surface to redirect electromagnetic waves incident on the other meta-surface away from the target point.

30. A user equipment (UE) for wireless communication, comprising:

a memory; and one or more processors, coupled to the memory, configured to:

determine, for a meta-surface on a glass surface of a vehicle, a transfer function that redirects electromagnetic waves incident on the meta-surface with an incident angle equal to a target incident angle or within a range of target incident angles toward or away from a target point within the vehicle based at least in part on a glass surface on which the meta-surface is disposed and a direction from which the electromagnetic waves are received; and control the meta-surface, via an electrical control signal, to dynamically configure the meta-surface to redirect the electromagnetic waves incident on the meta-surface in accordance with the transfer function.

* * * * *